United States Patent
Bai et al.

(10) Patent No.: US 11,015,093 B2
(45) Date of Patent: May 25, 2021

(54) TWO-COMPONENT SOLVENTLESS ADHESIVE COMPOSITIONS AND METHODS OF MAKING SAME

(71) Applicants: Dow Global Technologies LLC, Midland, MI (US); Rohm and Haas Company, Collegeville, PA (US)

(72) Inventors: Chenyan Bai, Shanghai (CN); Qiang Lu, Warrington, PA (US)

(73) Assignees: Dow Global Technologies LLC, Midi, MI (US); Rohm and Haas Company, Collegeville, PA (US)

( * ) Notice: Subject to any disclaimer, the term of this patent is extended or adjusted under 35 U.S.C. 154(b) by 148 days.

(21) Appl. No.: 16/089,054

(22) PCT Filed: Mar. 28, 2016

(86) PCT No.: PCT/CN2016/077479
§ 371 (c)(1),
(2) Date: Sep. 27, 2018

(87) PCT Pub. No.: WO2017/166005
PCT Pub. Date: Oct. 5, 2017

(65) Prior Publication Data
US 2019/0127617 A1    May 2, 2019

(51) Int. Cl.
| | | |
|---|---|---|
| *C09J 175/08* | (2006.01) | |
| *C09J 175/06* | (2006.01) | |
| *B32B 27/40* | (2006.01) | |
| *C08G 18/42* | (2006.01) | |
| *B32B 15/08* | (2006.01) | |
| *B32B 15/12* | (2006.01) | |
| *B32B 27/32* | (2006.01) | |
| *B32B 15/14* | (2006.01) | |
| *B32B 27/10* | (2006.01) | |
| *B32B 5/26* | (2006.01) | |
| *B32B 27/12* | (2006.01) | |
| *B32B 29/02* | (2006.01) | |
| *B32B 27/08* | (2006.01) | |
| *B32B 5/02* | (2006.01) | |
| *B32B 7/12* | (2006.01) | |
| *B32B 15/085* | (2006.01) | |
| *B32B 15/20* | (2006.01) | |
| *C08G 18/36* | (2006.01) | |
| *C08G 18/40* | (2006.01) | |
| *C08G 18/48* | (2006.01) | |

(Continued)

(52) U.S. Cl.
CPC ............ *C09J 175/08* (2013.01); *B32B 5/022* (2013.01); *B32B 5/024* (2013.01); *B32B 5/26* (2013.01); *B32B 7/12* (2013.01); *B32B 15/08* (2013.01); *B32B 15/085* (2013.01); *B32B 15/12* (2013.01); *B32B 15/14* (2013.01); *B32B 15/20* (2013.01); *B32B 27/08* (2013.01); *B32B 27/10* (2013.01); *B32B 27/12* (2013.01); *B32B 27/32* (2013.01); *B32B 27/40* (2013.01); *B32B 29/02* (2013.01); *C08G 18/36* (2013.01); *C08G 18/4018* (2013.01); *C08G 18/42* (2013.01); *C08G 18/4263* (2013.01); *C08G 18/4829* (2013.01); *C08G 18/6696* (2013.01); *C09J 5/00* (2013.01); *C09J 11/06* (2013.01); *C09J 175/06* (2013.01); *B32B 2250/02* (2013.01); *B32B 2250/20* (2013.01); *B32B 2250/24* (2013.01); *B32B 2250/26* (2013.01); *B32B 2255/10* (2013.01); *B32B 2255/205* (2013.01); *B32B 2307/31* (2013.01); *B32B 2307/714* (2013.01); *B32B 2307/732* (2013.01); *B32B 2405/00* (2013.01); *C09J 2475/00* (2013.01)

(58) Field of Classification Search
CPC ...................................................... C09J 175/08
See application file for complete search history.

(56) References Cited

U.S. PATENT DOCUMENTS

| | | | |
|---|---|---|---|
| 8,455,102 B2 | 6/2013 | Kinzelmann et al. | |
| 8,716,427 B2 | 5/2014 | Imai et al. | |
| (Continued) | | | |

FOREIGN PATENT DOCUMENTS

| | | |
|---|---|---|
| CA | 2218104 A1 | 10/1996 |
| JP | 2003-00314 A | 1/2003 |

OTHER PUBLICATIONS

PCT/CN2016/077479, International Search Report and Written Opinion dated Mar. 28, 2016.

(Continued)

*Primary Examiner* — Daniel H Lee
(74) *Attorney, Agent, or Firm* — William Hales

(57) ABSTRACT

A two-component solventless adhesive composition is disclosed, the composition comprising an isocyanate component comprising an isocyanate prepolymer that is the reaction product of reactants comprising at least one polyisocyanate, at least one polyester polyol, at least one polyether polyol, and at least one polyol comprising a hydroxyl and COOH acid functionality. The adhesive composition further comprises a polyol component comprising at least one polyester polyol, at least one polyether polyol, or a combination thereof. A method for forming a laminate using the adhesive composition and a laminate itself are also disclosed. The method comprises forming a solventless adhesive composition, applying a layer of the adhesive composition to a surface of a film, bringing the layer into contact with a surface of another film to form a laminate, and curing the adhesive composition. A laminate made according to the method is further disclosed.

7 Claims, No Drawings

(51) Int. Cl.
*C08G 18/66* (2006.01)
*C09J 5/00* (2006.01)
*C09J 11/06* (2006.01)

(56) References Cited

U.S. PATENT DOCUMENTS

2011/0318552 A1    12/2011   Johnson
2012/0258306 A1*   10/2012   Kinzelmann .......... C08G 18/12
                                                                                  428/340

OTHER PUBLICATIONS

PCT/CN2016/077479, International Preliminary Report on Patentability dated Oct. 11, 2018.

* cited by examiner

TWO-COMPONENT SOLVENTLESS ADHESIVE COMPOSITIONS AND METHODS OF MAKING SAME

FIELD OF THE DISCLOSURE

The instant disclosure relates to solventless adhesive compositions. More particularly, the disclosure relates to two-component solventless adhesive compositions for use with laminate films, the compositions having improved bond strength, chemical resistance, and heat seal strength, and methods of making the same.

BACKGROUND OF THE DISCLOSURE

Adhesive compositions are useful for a wide variety of purposes. For instance, adhesive compositions are used to bond together substrates such as polyethylenes, polypropylenes, polyesters, polyamides, metals, papers, or cellophane to form composite films, i.e., laminates. The use of adhesives in different laminating end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive varies by category and by the application in which the adhesive is applied.

Solventless laminating adhesives can be applied up to 100% solids without either organic solvents or an aqueous carrier. Because no organic solvent or water has to be dried from the adhesive upon application, these adhesives can be run at high line speeds and are preferable in applications requiring quick adhesive application. Solvent and water-based laminating adhesives are limited by the rate at which the solvent or water carrier can be effectively dried and removed upon application. For environmental, health, and safety reasons, laminating adhesives are preferably aqueous or solventless.

Within the category of solventless laminating adhesives, there are many varieties. One particular variety includes two-component polyurethane-based laminating adhesives. Typically, a two-component polyurethane-based laminating adhesive includes a first component comprising an isocyanate-containing prepolymer and a second component comprising one or more polyols. The first component is obtained by the reaction of a polyisocyanate with a polyether polyol and/or polyester polyol. The second component is a polyether polyol and/or a polyester polyol. Each component can optionally include one or more additives. The two components are combined in a predetermined ratio and applied on a film/foil substrate, which is then laminated to another film/foil substrate.

Two-component solventless polyurethane-based laminating adhesives, compared to traditional solvent-containing adhesives, include weak initial bonds and slow bond development before the laminate can be processed. In addition, these adhesives tend to exhibit relatively poor chemical resistance, especially in acidic conditions, as well as poor heat seal strength. In some instances, a silane adhesion promoter is incorporated in the adhesive composition to improve initial bond strength. However, silane adhesion promoters cannot withstand heat and acid resistance, and the bond strength of the adhesive composition suffers after heat and/or acid treatment. Further, laminates incorporating silane adhesion promoters require dry storage environments because silane is sensitive to moisture.

Therefore, two-component solventless polyurethane-based laminating adhesive compositions with improved bond strength, chemical resistance, and heat seal strength, and methods of making same, are desirable.

SUMMARY OF THE DISCLOSURE

A two-component solventless adhesive composition is disclosed. The adhesive composition comprises an isocyanate component comprising an isocyanate prepolymer that is the reaction product of reactants comprising at least one polyisocyanate, at least one polyol selected from the group consisting of a polyester polyol, a polyether polyol, and combinations thereof, and at least one polyol having at two or more hydroxyl ("OH") groups and a hydrogen-bridging group selected from O=C—O$^-$, O=C—C—O$^-$, O=C—C=C—O$^-$, or protonated forms thereof. The adhesive composition further comprises a polyol component comprising at least one polyol selected from the group consisting of a polyester polyol, a polyether polyol, and combinations thereof. Inclusion of the polyol(s) having two or more OH groups and a hydrogen-bridging group in the isocyanate prepolymer reactants improves the bond strength and chemical resistance of the disclosed adhesive compositions relative to existing two-component solventless adhesive compositions.

A method for forming a laminate is also disclosed. The method comprises forming a solventless adhesive composition, the composition comprising at least one polyol comprising two or more OH groups and a hydrogen-bridging group, applying a layer of the adhesive composition to a surface of a film, bringing the layer into contact with a surface of another film to form a laminate, and curing the adhesive composition. A laminate formed by this method is also disclosed.

DETAILED DESCRIPTION OF THE DISCLOSURE

The two-component solventless adhesive composition according to this disclosure comprises an isocyanate component and a polyol component.

Isocyanate Component

The isocyanate component comprises at least one isocyanate prepolymer that is the reaction product of reactants (the "prepolymer reactants") comprising at least one polyisocyanate, at least one polyol selected from the group consisting of a polyester polyol, a polyether polyol, and combinations thereof, and at least one polyol having two or more OH groups, that react with isocyanate groups (i.e., R—N=C=O), and containing a hydrogen-bridging group, the hydrogen-bridging group selected from O=C—O$^-$, O=C—C—O$^-$, O=C—C=C—O$^-$, or protonated forms thereof. Each of the prepolymer reactants is discussed in detail below.

As used herein, a "polyisocyanate" is any compound that contains two or more isocyanate groups. An "aromatic polyisocyanate" is a polyisocyanate that contains one or more aromatic rings. An "aliphatic polyisocyanate" contains no aromatic rings.

Polyisocyanates suitable for use according to this disclosure can be selected from the group consisting of aromatic polyisocyanates, aliphatic polyisocyanates, and combinations thereof. Examples of aromatic polyisocyanates suitable for use according to this disclosure include, but are not limited to, isomers of methylene diphenyl dipolyisocyanate ("MDI") such as 4, 4-MDI, 2, 4-MDI and 2,2'-MDI, isomers of toluene-dipolyisocyanate ("TDI") such as 2, 4-TDI, 2, 6-TDI, isomers of naphthalene-dipolyisocyanate ("NDI") such as 1, 5-NDI, and combinations thereof. Examples of aliphatic polyisocyanates suitable for use according to this disclosure include, but are not limited to, isomers of hexamethylene dipolyisocyanate ("HDI"), isomers of isophorone dipolyisocyanate ("IPDI"), isomers of xylene dipolyisocyanate ("XDI"), and combinations thereof.

The amount of the polyisocyanate in the isocyanate component is, by weight based on the weight of the isocyanate component, at least 10 wt %, or at least 20 wt %, or at least 30 wt %. The amount of the at least one polyisocyanate in the isocyanate component is not to exceed, by weight based on the weight of the isocyanate component, 80 wt %, or 70 wt %, or 65 wt %.

A compound with two or more hydroxyl groups is a "polyol." A polyol with exactly two hydroxyl groups is a "diol." A polyol with exactly three hydroxyl groups is a "triol." A compound that contains two or more ester linkages in the same linear chain of atoms is known herein as a "polyester." A compound that is a polyester and a polyol is known herein as a "polyester polyol." The disclosed polyester polyols have a molecular weight not to exceed 4,000 g/mol. In addition, the disclosed polyester polyols have a hydroxyl group functionality of at least 1.5 and not to exceed 3 (i.e., $1.5 \leq f \leq 3$).

Polyester polyols suitable for use according to this disclosure are known polycondensates of diols and also, optionally, polyols (e.g., triols, tetraols), and of dicarboxylic acids and also, optionally, polycarboxylic acids (e.g., tricarboxylic acids, tetracarboxylic acids) or hydroxycarboxylic acids or lactones. The polyester polyols can also be derived from, instead of the free polycarboxylic acids, the corresponding polycarboxylic anhydrides, or corresponding polycarboxylic esters of lower alcohols.

Suitable diols include, but are not limited to, ethylene glycol, butylene glycol, diethylene glycol, triethylene glycol, polyalkylene glycols, such as polyethylene glycol, and also 1,2-propanediol, 1,3-propanediol, 1,3-butanediol, 1,4-butanediol, 1,6-hexanediol, and neopentyl glycol. In order to achieve a polyester polyol functionality greater than 2, polyols having a functionality of 3 can optionally be included in the adhesive composition (e.g., trimethylolpropane, glycerol, erythritol, pentaerythritol, trimethylolbenzene or trishydroxyethyl isocyanurate).

Suitable dicarboxylic acids include, but are not limited to, aliphatic acids, aromatic acids, and combinations thereof. Examples of suitable aromatic acids include phthalic acid, isophthalic acid, terephthalic acid, and tetrahydrophthalic acid. Examples of suitable aliphatic acids include hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, 2,2-dimethyl succinic acid, and trimellitic acid. As used herein, the term "acid" also includes any anhydrides of said acid. Further, monocarboxylic acids, such as benzoic acid and hexane carboxylic acid, should be minimized or excluded from the disclosed compositions. Saturated aliphatic or aromatic acids are preferred, such as adipic acid or isophthalic acid.

The amount of the polyester polyol in the isocyanate component is, by weight based on the weight of the isocyanate component, at least 2 wt %, or at least 5 wt %, or at least 8 wt %. The amount of the polyester polyol in the isocyanate component is not to exceed, by weight based on the weight of the isocyanate component, 45 wt %, or 40 wt %, or 35 wt %.

A compound that contains two or more ether linkages in the same linear chain of atoms is known herein as a "polyether." A compound that is a polyether and a polyol is a "polyether polyol." The disclosed polyether polyols have a molecular weight not to exceed 5,000 g/mol. In addition, the disclosed polyether polyols have a hydroxyl group functionality of at least 1.5 and not to exceed 4 (i.e., $1.5 \leq f \leq 4$).

Polyether polyols suitable for use according to this disclosure are the polyaddition products of ethylene oxide, propylene oxide, tetrahydrofuran, butylene oxide, and the co-addition and grafted products thereof, as well as the polyether polyols obtained by condensation of polyhydric alcohols or mixtures thereof. Examples of polyether polyols suitable for use include, but are not limited to, polypropylene glycol ("PPG"), polyethylene glycol ("PEG"), polybutylene glycol, and polytetramethylene ether glycol ("PTMEG").

The amount of the polyether polyol in the isocyanate component is, by weight based on the weight of the isocyanate component, at least 5 wt %, or at least 10 wt %, or at least 15 wt %. The amount of the polyether polyol in the isocyanate component is not to exceed, by weight based on the weight of the isocyanate component, 45 wt %, or 40 wt %, or 35 wt %.

The isocyanate component further comprises a polyol having two or more OH groups at the end of the polyol molecular chain and at least one hydrogen-bridging group in a side molecular chain. Examples of suitable hydrogen-bridging groups include, but are not limited to, O=C—O$^-$, O=C—C—O$^-$, and O=C—C=C—O$^-$, and pronated forms thereof. The disclosed polyol having two or more OH groups and a hydrogen-bridging group further has an acid value of at least 50 mg KOH/g and not to exceed 200 mg KOH/g. In addition, the disclosed polyol has a molecular weight of at least 600 g/mol and not to exceed 3,000 g/mol. Still further, the disclosed polyol has a hydroxyl group functionality of at least 1.8 and not to exceed 3 (i.e., $1.8 \leq f \leq 3$).

The amount of the polyol having two or more OH groups and a hydrogen-bridging group in the isocyanate component is, by weight based on the weight of the isocyanate component, at least 0.01 wt %, or at least 0.1 wt %, or at least 1 wt %. The amount of the polyol having two or more OH groups and a hydrogen-bridging group in the isocyanate component is not to exceed, by weight based on the weight of the isocyanate component, 25 wt %, or 20 wt %, or 15 wt %.

The disclosed isocyanate component may optionally further comprise a bio-based polyol, such as castor oil or other known bio-based polyols. The disclosed bio-based polyol has a hydroxyl group functionality of at least 1.5 and not to exceed 4 (i.e., $1.5 \leq f \leq 4$).

When optionally included in the isocyanate component, the amount of the bio-based polyol in the isocyanate component is, by weight based on the weight of the isocyanate component, at least 0.01 wt %, or at least 0.1 wt %, or at least 3 wt %. The amount of the bio-based polyol in the isocyanate component is not to exceed, by weight based on the weight of the isocyanate component, 15 wt %, or 10 wt %, or 5 wt %.

Compounds having polyisocyanate groups, such as the isocyanate prepolymer of the isocyanate component, may be characterized by the parameter "% NCO," which is the amount of polyisocyanate groups by weight based on the weight of the compound. The parameter % NCO is measured by the method of ASTM D 2572-97(2010). The disclosed isocyanate component has a % NCO of at least 3 wt %, or at least 5 wt %, or at least 7 wt %. In some embodiments, the isocyanate component has a % NCO not to exceed 30 wt %, or 25 wt %, or 22 wt %, or 19 wt %.

In some embodiments, the isocyanate component has viscosity at 25° C. of 300 mPa-s to 20,000 mPa-s, as measured by the method of ASTM D2196.

The isocyanate component can, optionally, comprise one or more catalysts. Examples of the at least one catalyst suitable for use according to this disclosure include, but are not limited to, dibutyltin dilaurate, zinc acetate, 2,2-dimorpholinodiethylether, and combinations thereof.

Polyol Component

The solventless adhesive composition further comprises a polyol component comprising at least one polyol selected from the group consisting of a polyester polyol, a polyether polyol, and combinations thereof. The polyol component can optionally include a polyol having a two or more OH groups and a hydrogen-bridging group, adhesion promoters, and diol or triol monomers.

Polyester polyols suitable for use in the polyol component have a molecular weight not to exceed 4,000 g/mol. In addition, the disclosed polyester polyols have a hydroxyl group functionality of at least 1.5 and not to exceed 3 (i.e., 1.5≤f≤3).

Polyester polyols suitable for use according to this disclosure are known polycondensates of diols and also, optionally, polyols (e.g., triols, tetraols), and of dicarboxylic acids and also, optionally, polycarboxylic acids (e.g., tricarboxylic acids, tetracarboxylic acids) or hydroxycarboxylic acids or lactones. The polyester polyols can also be derived from, instead of the free polycarboxylic acids, the corresponding polycarboxylic anhydrides, or corresponding polycarboxylic esters of lower alcohols.

Suitable diols include, but are not limited to, ethylene glycol, butylene glycol, diethylene glycol, triethylene glycol, polyalkylene glycols, such as polyethylene glycol, and also 1,2-propanediol, 1,3-propanediol, 1,3-butanediol, 1,4-butanediol, 1,6-hexanediol, and neopentyl glycol. In order to achieve a polyester polyol functionality greater than 2, polyols having a functionality of 3 can optionally be included in the adhesive composition (e.g., trimethylolpropane, glycerol, erythritol, pentaerythritol, trimethylolbenzene or trishydroxyethyl isocyanurate).

Suitable dicarboxylic acids include, but are not limited to, aliphatic acids, aromatic acids, and combinations thereof. Examples of suitable aromatic acids include phthalic acid, isophthalic acid, terephthalic acid, and tetrahydrophthalic acid. Examples of suitable aliphatic acids include hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, 2,2-dimethyl succinic acid, and trimellitic acid. As used herein, the term "acid" also includes any anhydrides of said acid. Further, monocarboxylic acids, such as benzoic acid and hexane carboxylic acid, should be minimized or excluded from the disclosed compositions. Saturated aliphatic or aromatic acids are preferred, such as adipic acid or isophthalic acid.

The amount of the polyester polyol in the polyol component is, by weight based on the weight of the polyol component, at least 0 wt %, or at least 5 wt %, or at least 8 wt %. The amount of the polyester polyol in the polyol component is not to exceed, by weight based on the weight of the polyol component, 100 wt %, or 90 wt %, or 80 wt %.

Polyether polyols suitable for use in the polyol component have a molecular weight not to exceed 5,000 g/mol. In addition, the disclosed polyether polyols have a hydroxyl group functionality of at least 1.5 and not to exceed 3 (i.e., 1.5≤f≤4).

Polyether polyols suitable for use according to this disclosure are the polyaddition products of ethylene oxide, propylene oxide, tetrahydrofuran, butylene oxide, and the co-addition and grafted products thereof, as well as the polyether polyols obtained by condensation of polyhydric alcohols or mixtures thereof. Examples of polyether polyols suitable for use include, but are not limited to, polypropylene glycol ("PPG"), polyethylene glycol ("PEG"), polybutylene glycol, and polytetramethylene ether glycol ("PTMEG").

The amount of the polyether polyol in the polyol component is, by weight based on the weight of the polyol component, at least 0 wt %, or at least 10 wt %, or at least 20 wt %. The amount of the polyether polyol in the polyol component is not to exceed, by weight based on the weight of the isocyanate component, 100 wt %, or 90 wt %, or 80 wt %.

In some embodiments, the weight ratio of the isocyanate component to the polyol component is 1:1 or higher, or 1.5:1 or higher; or 1.8:1 or higher. In some embodiments, the weight ratio of the isocyanate component to the polyol component is 5:1 or lower, or 4.5:1 or lower, or 4:1 or lower.

It is contemplated that the isocyanate component and the polyol component of the disclosed solventless adhesive composition can be made separately and, if desired, stored until it is desired to use the adhesive composition. In some embodiments, both the isocyanate component and the polyol component are each liquid at 25° C. When it is desired to use the adhesive composition, the isocyanate component and the polyol component are brought into contact with each other and mixed together. It is contemplated that when these two components are brought into contact, a curing reaction begins in which the isocyanate groups react with the hydroxyl groups to form urethane links. The adhesive composition formed by bringing the two components into contact can be referred to as a "curable mixture."

A method of forming a laminate using an adhesive composition is also disclosed. In some embodiments, the adhesive composition, such as the adhesive composition discussed above, is in a liquid state. In some embodiments, the composition is a liquid at 25° C. Even if the composition is solid at 25° C., it is acceptable to heat the composition as necessary to put it in a liquid state. A layer of the composition is applied to a surface of a film. A "film" is any structure that is 0.5 mm or less in one dimension and is 1 cm or more in both of the other two dimensions. A polymer film is a film that is made of a polymer or mixture of polymers. The composition of a polymer film is, typically, 80 percent by weight or more by weight one or more polymers. In some embodiments, the thickness of the layer of the curable mixture is 1 to 5 μm.

In some embodiments, a surface of another film is brought into contact with the layer of the curable mixture to form an uncured laminate. In some embodiments, the uncured laminate is made at a time when the amount of unreacted polyisocyanate groups present in the adhesive composition is, on a molar basis compared to the amount of polyisocyanate groups present in the isocyanate component prior to contact with the polyol component, at least 50%, or at least 75%, or at least 90%. The uncured laminate is further made at a time when the amount of unreacted polyisocyanate groups present in the curable mixture is less than 100%, or less than 97%, or less than 95%.

The curable mixture is then cured or allowed to cure. The uncured laminate may be subjected to pressure, for example by passing through nip rollers, which may or may not be heated. The uncured laminate may be heated to speed the cure reaction.

Suitable films include paper, woven and nonwoven fabric, metal foil, polymers, and metal-coated polymers. Films optionally have a surface on which an image is printed with ink; the ink may be in contact with the adhesive composition. In some embodiments, the films are polymer films and metal-coated polymer films, more preferred are polymer films.

EXAMPLES OF THE DISCLOSURE

The present disclosure will now be explained in further detail by Illustrative Examples and Comparative Examples (collectively, "the Examples"). However, the scope of the present disclosure is not, of course, limited to the formulations set forth in the examples. Rather, the Examples are merely illustrative of the disclosure.

Composition Preparation

The raw materials used to prepare the Examples are identified in Table 1 below by commercial name and supplier.

TABLE 1

Raw Materials

| Component | Name | Commercial Supplier |
|---|---|---|
| Isocyanate | MOR-FREE ™ 698A | The Dow Chemical Company |
| Polyol | MOR-FREE ™ C-83 MOR-FREE ™ C-411 | The Dow Chemical Company |
| Polyol Comprising Hydrogen-Bridging Group | HA-0135 | GEO Specialty Chemicals, Inc. |

The isocyanate components of the Examples ($A_1$ to $A_4$) are synthesized by adding HA-0135 into the commercial grade MOR-FREE™ 698A formulation during the synthesis process according to formulations listed in Table 2. The formulations in Table 2 are shown in percent by weight based on total weight of the isocyanate component.

TABLE 2

Isocyanate component Compositions $A_1$ to $A_4$

| Component | $A_1$ | $A_2$ | $A_3$ | $A_4$ |
|---|---|---|---|---|
| MOR-FREE ™ 698A | 100 | 94.5 | 97 | 98.5 |
| Polyol HA-0135 | | 4.5 | 3 | 1.5 |
| TOTAL | 100 | 100 | 100 | 100 |

The polyol components of the Examples ($B_1$ to $B_4$) are synthesized according to the formulations listed in Table 3. The raw material formulations in Table 3 are shown in percent by weight based on total weight of the polyol component.

TABLE 3

Polyol Component Compositions $B_1$ to $B_4$

| Raw material | $B_1$ | $B_2$ | $B_3$ | $B_4$ |
|---|---|---|---|---|
| MOR-FREE ™ C-83 | 100 | 99 | | 95 |
| MORFREE ™ C-411 | | | 100 | |
| DMPA ™ Polyol HA-0135 | | | | 5 |
| SILQUEST ™ A-187 | | 1 | | |
| TOTAL | 100 | 100 | 100 | 100 |

For both the Illustrative Examples and Comparative Examples, the isocyanate component is synthesized in a 1,000 ml glass reactor according to a typical polyurethane prepolymer preparation process. The polyisocyanate is introduced into the reactor and maintained at 60° C. with nitrogen protection. Next, the various polyols are introduced into the reactor according to the compositions in Table 2. The temperature is slowly increased to 80° C. and maintained for 2 to 3 hours. Finally, the produced isocyanate prepolymer, i.e., the isocyanate component, is charged into a sealed container with nitrogen protection for further application.

The polyol component includes a mixture of polyols, as indicated in Table 3. Before introducing the raw materials of the polyol component into the reactor, the moisture content of the raw materials should be less than 500 ppm. While stirring and mixing the raw materials in the polyol component, nitrogen is supplied to avoid moisture contamination of the mixture.

To prepare the Illustrative Examples and Comparative Examples, the isocyanate components and polyol components are then mixed according to the pairings illustrated in Table 4 to form the adhesive compositions of the Examples.

TABLE 4

Polyisocyanate/Polyol Pairings of IEs and CEs

| Example | Polyisocyanate and Polyol Component Pairings |
|---|---|
| Comparative Example 1 | $A_1/B_1$ |
| Comparative Example 2 | $A_1/B_2$ |
| Illustrative Example 1 | $A_2/B_1$ |
| Illustrative Example 2 | $A_3/B_3$ |
| Illustrative Example 3 | $A_4/B_4$ |

The adhesive compositions of the Examples are then used to form laminates comprising polyethylene and aluminum films. The adhesive compositions are applied to the polyethylene at 2.0 gsm coating weight, brought together with the aluminum film, and then cured at 50° C. for 24 hours to form the laminates. Once the laminate is formed, tests are conducted to analyze the bond strength, heat seal strength, and boil-in-bag resistance with water and apple juice.

Laminate Performance Testing

Laminates prepared from the adhesive compositions of the Examples are subjected to bond strength testing. The laminates are cut into 15 mm width strips for T-peel testing under 250 mm/min crosshead speed using a 5940 Series Single Column Table Top System available from Instron Corporation. During testing, the tail of each strip is pulled slightly by hand to ensure the tail remained at a 90° angle to the peeling direction. Three strips are tested for each sample and the average value is calculated. Results are in the unit of N/15 mm. Relatively higher values indicate better bond strength.

Laminates prepared from the adhesive compositions of the Examples are subjected to heat seal strength testing. The laminates are heat sealed in a HSG-C Heat-Sealing Machine available from Brugger Feinmechanik GmbH under 140° C. seal temperature and 300N pressure for 1 second. The laminates are then cooled down and cut into 15 mm width strips for heat seal strength testing under 250 mm/min crosshead speed using a 5940 Series Single Column Table Top System available from Instron Corporation. Three strips are tested for each sample and the average value is calculated. Results are in the unit of N/15 mm. Relatively higher values indicate better heat seal strength.

Laminates prepared from the adhesive compositions of the Examples are subjected to boil-in-bag resistance testing. The laminates are cut into 8 cm×12 cm pieces and made into a bag through heat sealing with water inside the bag. The bags are then placed in boiling water and left for 30 minutes, ensuring the bags are always immersed in water during the entire boiling process. The extent of tunneling, de-lamination, and/or leakage of the bags is recorded upon completion of the boiling process. For a sample to pass the boil-in-bag resistance testing, it must show no evidence of tunneling, de-lamination, or leakage. Then bags are then opened, emptied, and allowed to cool before being cut into 15 mm width strips to test the T-peel bonding strength in Instron 5943 machine. Three strips are tested to take the average value.

TABLE 5

Performance Testing Results

| Example | Bond Strength (N/15 mm) | Heat Seal Strength (N/15 mm) | Bond Strength after BiB with $H_2O$ (N/15 mm) | Bond Strength after BiB with Apple Juice (N/15 mm) |
|---|---|---|---|---|
| Comparative Example 1 | 5.4 | 45 | 2.5 | 1.8 |
| Comparative Example 2 | 3.4 | 40 | 1.4 | 1.3 |
| Illustrative Example 1 | 5.7 | 48 | 5.7 | 6.5 |
| Illustrative Example 2 | 5.0 | 48 | 5.4 | 5.5 |
| Illustrative Example 3 | 6.3 | 49 | 9.8 | 11.0 |

The Examples exhibit good bond strength and heat seal strength at room temperature. However, the Comparative Examples exhibit decreased bond strength after boil-in-bag testing is completed. The Inventive Examples, on the other hand, exhibit the same or even increased bond strength after boil-in-bag testing is completed. Further, the Inventive Examples exhibit increased heat seal strength compared to the Comparative Examples.

As discussed above and noted in Tables 2-4, the Comparative Examples are similar compositionally to the Illustrative Examples other than the polyol comprising a polyol comprising a hydrogen-bridging group. Accordingly, inclusion of this polyol in at least the isocyanate component of the adhesive composition results in laminates with better bond strength after being subjected to boil-in-bag treatment.

The invention claimed is:

1. A two-component solventless adhesive composition, comprising:
    an isocyanate component comprising an isocyanate prepolymer that is the reaction product of reactants comprising:
        at least one polyisocyanate;
        at least one polyol selected from the group consisting of a polyester polyol, a polyether polyol, and combinations thereof; and
        at least one polyol having two or more OH groups and a hydrogen-bridging group selected from O=C—O$^-$, O=C—C—O$^-$, O=C—C=C—O$^-$, or protonated forms thereof, wherein the at least one polyol having two or more OH groups and a hydrogen-bridging group has a molecular weight of from 600 to 3,000 g/mol, and
    a polyol component comprising at least one polyol selected from the group consisting of a polyester polyol, a polyether polyol, and combinations thereof.

2. The composition of claim 1, wherein at least one of the isocyanate component and the polyol component further comprises a bio-based polyol.

3. The composition of claim 2, wherein the bio-based polyol is castor oil.

4. The composition of claim 1, wherein the ratio by weight of isocyanate component to polyol component is from 5:1 to 1:1.

5. The composition of claim 1, wherein the polyol component further comprises an adhesion promoter selected from the group consisting of aminosilane, epoxy silane, and combinations thereof.

6. The composition claim 1, wherein the polyol component further comprises a polyol having two or more OH groups and a hydrogen-bridging group.

7. The composition of claim 1, wherein the polyol having the OH groups and a hydrogen-bridging group comprises both hydroxyl and COOH acid functionality.

* * * * *